UNITED STATES PATENT OFFICE 2,411,969

PROCESS FOR THE PREPARATION OF SYNTHETIC DL-TOCOPHEROLS

Paul Karrer, Zurich, and Otto Isler, Basel, Switzerland, assignors to Hoffmann-La Roche Inc., Nutley, N. J., a corporation of New Jersey No Drawing. Application August 12, 1941, Serial No. 406,555. In Switzerland March 31, 1938

14 Claims. (Cl. 260—333A)

The present invention relates to a process for the preparation of synthetic tocopherols which are racemic with respect to carbon atom 2 of the chromane ring.

This application is a continuation-in-part of our application Serial No. 231,846, filed September 26, 1938.

Evans and collaborators (Mem. Univ. California, vol. 8, year 1927) discovered that a nutritive factor which is indispensable for spermatogenesis in male rats and the successful completion of an existing pregnancy in female rats is contained in wheat germ oil and various foodstuffs. They named the new biological factor vitamin E and described a biological method of determination using female rats. Evans, Emerson and Emerson (J. Biol. Chem., vol. 113, year 1936, page 319, and vol. 122, year 1937, page 99) succeeded in isolating three distinct chemical substances from wheat germ oil and various other vegetable oils which are responsible for the vitamin E action of the starting materials. These closely related compounds were named α-, β- and γ-tocopherols. Investigations by Fernholz (J. Amer. Chem. Soc., vol. 59, year 1937, page 1154; vol. 60, year 1938, page 700), Karrer and collaborators (Helvetica Chimica Acta, vol. 20, year 1937, page 1422; vol. 21, year 1938, page 309), Bergel, Todd and collaborators (Biochem. J., vol. 31, year 1937, page 2257; J. Chem. Soc., year 1938, page 253), as well as John and collaborators (Zeitschrift für physiologische Chemie, vol. 250, year 1937, page 11; vol. 252, year 1938, pages 201, 208) confirm and supplement the knowledge of the first-named investigators regarding tocopherols.

Natural α-tocopherol was characterized by the empirical formula $C_{29}H_{50}O_2$, by an allophanate melting at 158° C., by a p-nitrophenylurethane melting at 131° C., and by a sublimate of durohydroquinone on thermal decomposition. β-Tocopherol possesses the empirical formula $C_{28}H_{48}O_2$, and yields an allophanate melting at 143–144° C. and a sublimate of trimethylhydroquinone on thermal decomposition. An allophanate melting at 135° C. was produced from γ-tocopherol which has the empirical formula $C_{28}H_{48}O_2$.

It has now been found that by reacting trimethylhydroquinone or dimethylhydroquinone with isophytol of the formula

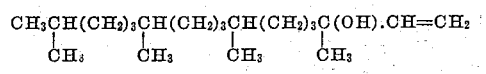

under acid conditions, and preferably in the presence of acid condensing agents, compounds can be obtained which contain a heterocyclic ring which must be regarded as chromane derivatives of the general formula

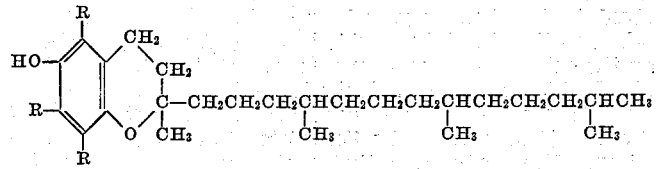

wherein two of the R radicals are methyl and the other is methyl or hydrogen. The reaction may, for example, be carried out in the presence of anhydrous zinc chloride, formic acid or while passing gaseous hydrogen chloride through the reaction mixture. It has also been found particularly suitable to employ a combination of zinc chloride and hydrogen chloride.

The new compounds are the racemates, with respect to carbon atom 2 of the chromane ring, of tocopherols obtained from natural raw materials. They are light yellow, slightly viscous oils which, in the cold, gradually reduce alcoholic silver nitrate solution. On heating the reduction proceeds quickly. These oils dissolve in concentrated sulfuric acid with a yellow color, and the solutions fluoresce intensively after a few hours' exposure to ultra violet light. The solution of the compounds in chloroform yields a deep dark brown coloration on the addition of tetranitromethane, which gradually clears up. On thermal decomposition the compounds form sublimates of durohydroquinone or trimethylhydroquinone. When rats so far kept on a vitamin E-free diet were given these synthetic compounds, it could be established that they rendered it possible for a litter of healthy young rats to be born exactly as did tocopherols isolated from natural products.

The new compounds are to be used as pharmaceutical preparations or as starting materials for the manufacture of pharmaceutical preparations.

Example 1

1.5 parts by weight of trimethylhydroquinone and 3.0 parts by weight of isophytol are heated with 10 parts by weight of anhydrous formic acid for six hours. The mixture is diluted with water, extracted with ether, the ether layer washed with sodium hydroxide, then with water, and the solvent evaporated. The condensation product remains as a viscous oil which readily reduces methyl-alcoholic silver nitrate solution. After purification, preferably by distillation below 1 mm. pressure, its absorption spectrum has a maximum at 294 µµ. The compound forms a crystalline allophanate of melting point 172–173° C. The product is dl-α-tocopherol of the formula

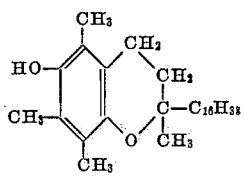

Example 2

4 parts by weight of isophytol, 2 parts by weight of 2,5-dimethyl hydroquinone and 2 parts by weight of zinc chloride are suspended in 10 parts of decalin and heated to 150° C. for one hour while passing carbon dioxide through the melt. The reaction product is cooled and water and ether added while stirring. The ether layer is separated, washed with water and potassium carbonate solution, then with hydrochloric acid, then with water, and finally dried with sodium sulfate. The ether is removed, the residue dissolved in low boiling petroleum ether and absorbed on the aluminium oxide column. By eluting the yellowish brown upper zone, an oil is obtained which reduces an alcoholic solution of silver nitrate on boiling and contains 0.2 per cent of active hydrogen by the Zerewitinoff determination. The product has the constitution

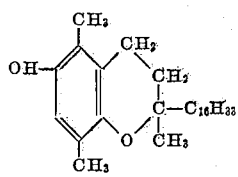

and shows a melting point of 154° C.

Example 3

4 parts by weight of isophytol, 3.5 parts by weight of 3,5-dimethylhydroquinone and 1 part by weight of anhydrous zinc chloride are heated to 180° C. for one-half hour with stirring and introducing carbon dioxide into the melt. The solution becomes homogeneous and after cooling is extracted with water and ether. The ether solution is washed with potash solution and then with water and the ether residue absorbed in an aluminium oxide column from low boiling petroleum ether. The chromatogram is developed with much petroleum ether, the whole of the lower part of the column becoming a whitish grey. The top layer of the aluminium oxide column which carries very little color is removed and the lower zone extracted with 3 parts of methyl alcohol and 1 part of ether. The solvent is evaporated in vacuo and the residue distilled on a molecular distillation apparatus. The compound is a yellow, slightly viscous oil, $n/25D=1.501$. It yields an allophanate melting at 143° C. and is active biologically in doses of 5 mg.

Example 4

1.5 parts by weight of 2,3-dimethylhydroquinone and 3 parts by weight of isophytol are heated with 10 parts by weight of anhydrous formic acid for six hours. The mixture is then cooled, diluted with water, extracted with ether and the ether layer washed with sodium hydroxide solution, then with water and the ether solution dried with sodium sulfate. After filtering from the sodium sulfate, a solvent is evaporated, taken up in a small quantity of low boiling petroleum ether and a chromatogram prepared on an aluminium oxide column. The upper layer of the column is a yellow brown layer which, when eluted, contains the expected condensation product of the following formula:

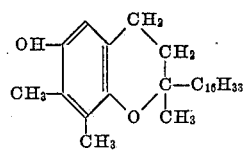

It is a viscous oil with a strong reducing action and contains one active hydrogen atom as shown by the Zerewitinoff determination. Its melting point is at 146° C.

It is fully active when tested on rats kept on a vitamin E-free diet in doses of 10 mg.

Example 5

2 parts by weight of zinc chloride, 10 parts by weight of isophytol, 5 parts by weight of trimethylhydroquinone are dissolved in a mixture of 20 parts by volume of ether and 20 parts by volume of benzol, maintaining a temperature of 45–55° C. Dry hydrochloric gas is passed through the mixture until complete saturation, which requires from two to four hours. The reaction liquid is then washed with water, then with hydrochloric acid, again with water, then with sodium chloride solution and finally the ether-benzol solution is dried and the solvents removed. The material is then worked up as in previous examples.

We claim:

1. In a process for the manufacture of a tocopherol product, the steps of producing a tocopherol of the formula

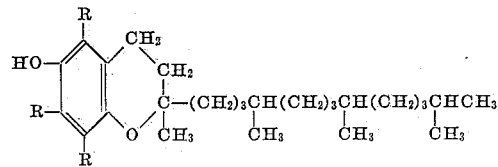

wherein two of the R radicals represent a methyl group and the third R radical represents a radical selected from the group consisting of hydrogen and methyl radicals, by condensing a methyl substituted hydroquinone of the formula

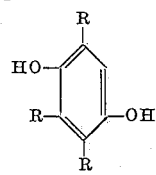

wherein two of the R radicals represent a methyl group and the third R radical represents a radical selected from the group consisting of hydrogen and methyl radicals, with isophytol under acid conditions, and recovering a tocopherol product from the reaction mixture thus obtained.

2. In a process for the manufacture of a tocopherol product, the steps of producing a tocopherol of the formula

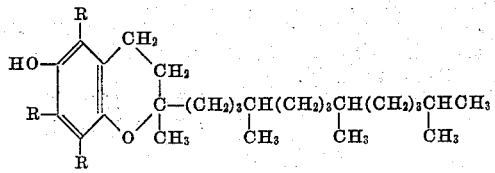

wherein two of the R radicals represent a methyl group and the third R radical represents a radical selected from the group consisting of hydrogen and methyl radicals, by condensing a methyl substituted hydroquinone of the formula

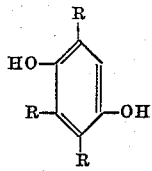

wherein two of the R radicals represent a methyl group and the third R radical represents a radical selected from the group consisting of hydrogen and methyl radicals, with isophytol in the presence of zinc chloride, and recovering a tocopherol product from the reaction mixture thus obtained.

3. In a process for the manufacture of a tocopherol product, the steps of producing a tocopherol of the formula

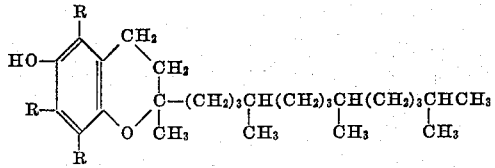

wherein two of the R radicals represent a methyl group and the third R radical represents a radical selected from the group consisting of hydrogen and methyl radicals, by condensing a methyl substituted hydroquinone of the formula

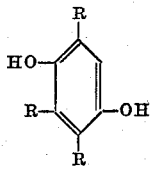

wherein two of the R radicals represent a methyl group and the third R radical represents a radical selected from the group consisting of hydrogen and methyl radicals, with isophytol in the presence of zinc chloride, a solvent, while passing gaseous hydrochloric acid through the mixture, and recovering a tocopherol product from the reaction mixture thus obtained.

4. In a process for the manufacture of a tocopherol product, the steps of producing an α-tocopherol of the formula

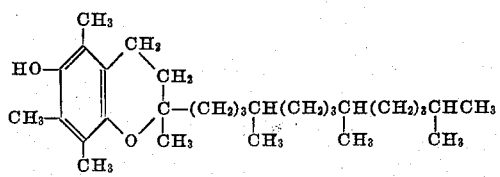

which comprises condensing trimethylhydroquinone with isophytol under acid conditions, and recovering a tocopherol product from the reaction mixture thus obtained.

5. In a process for the manufacture of a tocopherol product, the steps of producing an α-tocopherol of the formula

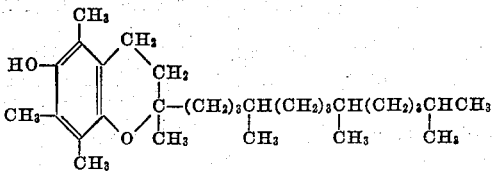

which comprises condensing trimethylhydroquinone with isophytol in the presence of zinc chloride, and recovering a tocopherol product from the reaction mixture thus obtained.

6. In a process for the manufacture of a tocopherol product, the steps of producing a tocopherol of the formula

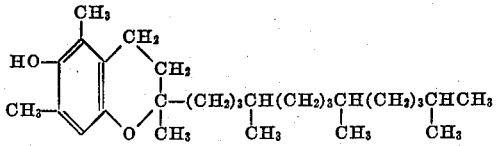

which comprises condensing 3,5-dimethylhydroquinone with isophytol under acid conditions, and recovering a tocopherol product from the reaction mixture thus obtained.

7. In a process for the manufacture of a tocopherol product, the steps of producing a tocopherol of the formula

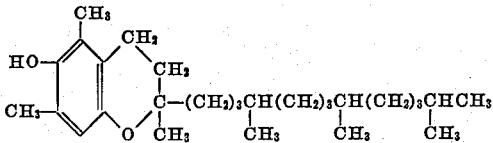

which comprises condensing 3,5-dimethylhydroquinone with isophytol in the presence of zinc chloride, and recovering a tocopherol product from the reaction mixture thus obtained.

8. In a process for the manufacture of a tocopherol product, the steps of producing a tocopherol of the formula

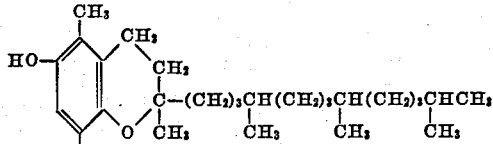

which comprises condensing 2,5-dimethylhydroquinone with isophytol under acid conditions, and recovering a tocopherol product from the reaction mixture thus obtained.

9. In a process for the manufacture of a tocopherol product, the steps of producing a tocopherol of the formula

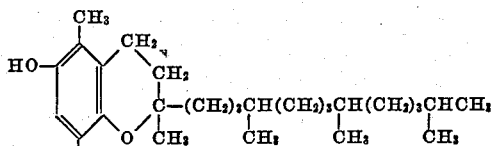

which comprises condensing 2,5-dimethylhydroquinone with isophytol in the presence of zinc chloride, and recovering a tocopherol product from the reaction mixture thus obtained.

10. A process for the manufacture of a tocopherol product which comprises reacting isophytol with an alkyl substituted para dihydroxy benzene having an unsubstituted position ortho to said hydroxyl, under acidic conditions.

11. The process of claim 10 in which the reaction is conducted in the presence of zinc chloride.

12. The process of claim 10 in which the reaction is conducted in the presence of formic acid.

13. A process for the manufacture of a tocopherol product, which comprises reacting isophytol with a methyl substituted para dihydroxy benzene in the presence of an acidic catalyst.

14. A process for the manufacture of a tocopherol product which comprises reacting isophytol with trimethyl hydroquinone in the presence of formic acid.

PAUL KARRER.
OTTO ISLER.